United States Patent [19]

Lucas et al.

[11] 4,183,764

[45] Jan. 15, 1980

[54] GELLED LACQUER

[75] Inventors: James M. Lucas, Houston, Tex.; James Teng, St. Louis County, Mo.

[73] Assignee: Anheuser-Busch, Incorporated, St. Louis, Mo.

[21] Appl. No.: 829,618

[22] Filed: Sep. 1, 1977

[51] Int. Cl.$^2$ ............................ C08L 1/18; C08L 1/32
[52] U.S. Cl. .................................. 106/178; 106/181; 106/195; 106/196; 106/197 R
[58] Field of Search ............... 106/181, 178, 183, 198, 106/195, 196; 252/316

[56] References Cited

U.S. PATENT DOCUMENTS

| | | | |
|---|---|---|---|
| 2,699,400 | 1/1955 | Brandner | 106/181 |
| 3,087,835 | 4/1963 | Auer | 106/195 |
| 3,870,701 | 3/1975 | Teng et al. | 252/316 |
| 3,892,585 | 7/1975 | Sagane | 252/316 |

*Primary Examiner*—Theodore Morris
*Attorney, Agent, or Firm*—Gravely, Lieder & Woodruff

[57] ABSTRACT

An overprint lacquer comprising a solvent, a resin, a plasticizer, and a gelling agent. The gelling agent is hydroxypropylcellulose acetate. The coatings of this gel-containing lacquer show improved adhesive characteristics and improved durability when compared with conventional overprint lacquers that have higher nitrocellulose content. Also, the viscosity of the lacquer is more readily controllable due to the presence of the gelling agent.

4 Claims, No Drawings

GELLED LACQUER

BACKGROUND OF THE INVENTION

One of the current lacquer formulations used to overcoat aluminum sheeting contains the following components in the amounts listed:

| | | |
|---|---|---|
| Nitrocellulose resin | 15.00 weight per cent | |
| Di(n-butyl) phthalate | 3.75 weight per cent | |
| Toluene | 20.31 weight per cent | |
| Isopropyl acetate | 60.94 weight per cent | |

Nitrocellulose resin acts as a coating agent. Other suitable coating agents include a copolymer of vinyl acetate and vinyl chloride, polyvinyl acetate, polyvinyl formal, polyvinylidene fluoride. Di(n-butyl) phthalate acts as a plasticizer for the resin. Other suitable plasticizers include dioctyl phthalate and di(n-hexyl) phthalate. The ratio, by weight, of di(n-butyl) phthalate to nitrocellulose resin (plasticizer to resin) is about 1 to 4. Toluene and isopropyl acetate function as solvents for the resin. Other suitable solvents include butyl acetate, xylene, and ethyl acetate.

SUMMARY OF THE INVENTION

This invention involves an overprint lacquer comprising a solvent or mixture of solvents, a resin, preferably nitrocellulose resin, a plasticizer for the resin, and a gelling agent. The gelling agent is hydroxypropylcellulose acetate. The adhesive properties of the coatings formed from the gelled lacquer can be seen to be improved over the properties associated with conventional lacquers, which have a higher nitrocellulose content. Moreover, the gelling agent permits more control of the viscosity of the lacquer.

DETAILED DESCRIPTION

The following components are mixed together in the amounts indicated:

| | | |
|---|---|---|
| Toluene | 32 to 34 | parts by weight |
| Isopropyl acetate | 39 to 43 | parts by weight |
| 95% ethyl alcohol | 8 to 9 | parts by weight |
| Di(n-Butyl) phthalate | 3 to 2 | parts by weight |
| Hydroxypropylcellulose acetate | 0.05 to 0.25 | parts by weight |
| (The degree of substitution of acetyl groups can range from 1.0 to 2.0; the degree of molecular substitution of hydroxypropyl groups can range from 3.5 to 4.5) | | |

The mixture is stirred and heated for 15 to 20 minutes at 50° C. to 60° C. in a reactor until the solution is complete and the liquid is smooth. The heating is discontinued and 18 to 12 parts by weight of nitrocellulose resin, R.S. ½ sec., containing about 30 weight percent of 95% ethyl alcohol, is added to the solution. The heating is renewed, and the mixture is stirred for an additional 20 to 30 minutes until the solution is complete and the lacquer is smooth and free from lumps. The lacquer is then allowed to cool.

The lacquer thus produced has a viscosity ranging from 20 to 25 sec. (as measured by a #3 Zahn cup). This value is approximately 0% to 25% greater than the viscosity of a similarly prepared lacquer which does not contain hydroxypropylcellulose acetate.

The following examples show specific formulations of the lacquer of this invention.

EXAMPLE I

A concentrated lacquer was prepared by mixing 17.7 g of nitrocellulose (R.S. ½ sec.) containing 5.5 g of 95% ethyl alcohol.

The foregoing mixture was further mixed with the following:

(a) 44.3 g of solvent which was composed of 5 parts by weight isopropyl acetate, 4 parts by weight toluene, and 1 part by weight 95% ethyl alcohol;

(b) 3.0 g of di(n-butyl) phthalate;

(c) 35.0 g of the solvent of (a) thickened with 0.20 g of hydroxypropylcellulose acetate.

The final lacquer contained 12.2% nitrocellulose. The lacquer thus produced had a viscosity of 25 sec., #3 Zahn cup.

EXAMPLE II

A concentrated lacquer was prepared by mixing 12.2 g of nitrocellulose (R.S. ½ sec.) containing 3.8 g of 95% ethyl alcohol.

The foregoing mixture was further mixed with the following:

(a) 30.7 g of a solvent which was composed of 5 parts by weight isopropyl acetate, 4 parts by weight toluene, and 1 part by weight 95% ethyl alcohol;

(b) 2.1 g of di(n-butyl) phthalate;

(c) 55.0 g of the solvent of (a) thickened with 0.40 g of hydroxypropylcellulose acetate. The final lacquer contained 8.4% nitrocellulose. The lacquer thus produced had a viscosity of 20 sec., #3 Zahn cup.

COMPARISON OF PHYSICAL PROPERTIES

The physical properties of lacquer coating from the lacquers in Examples I and II were compared to the properties of a coating from a conventional lacquer containing 14.2 weight percent nitrocellulose (R.S. ½ sec.), 3.5 weight percent di(n-butyl) phthalate. The conventional lacquer had a viscosity of 21 sec., #3 Zahn cup.

Paper strips (½ in. × 11 in.) and aluminum foil strips (½ in. × 11 in.) were coated with lacquers from Examples I and II and the conventional lacquers. The break strength was measured by an Instron Universal Testing Instrument. The results of this test are shown in Table I.

TABLE I

| Lacquer | Viscosity (sec., #3 Zahn cup) | Substrate | Coating Density (mg/cm$^2$) | Break Strength (kg) |
|---|---|---|---|---|
| Conventional Lacquer | 21 | paper | 3.2 | 4.1 |
| | | aluminum foil | 1.2 | 0.7 |
| Gelled Lacquer | 25 | paper | 2.5 | 4.7 |
| | | aluminum foil | 1.5 | 0.7 |
| Gelled Lacquer | 20 | paper | 1.9 | 4.7 |
| | | aluminum foil | 1.3 | 0.7 |

Aluminum coupons (4 in. × 4 in. × 0.013 in.) were coated with each of the lacquers (Examples I and II, conventional lacquer). The adhesion of the coatings was measured by the following tests:

1. Cross-hatch scratch and scotch tape peel.[1]
2. Impact by General Electric impact flexibility.[2]
3. FTMS Method 6223 Flexibility (cold cracking).[3]

[1] G. G. Sward (ed.), Paint Testing Manual, ASTM Special Technical Publication 500, ASTM 1972, p. 319.
[2] Ibid., p. 335.
[3] Ibid., pp. 333-335.

The results of the tests are shown in Table II.

TABLE II

| Lacquer | Coating Density (mg/cm$^2$) | Scotch Peel Test | Impact Flexibility Test | Flexibility (Cold Cracking Test) |
|---|---|---|---|---|
| Conventional Lacquer | 0.94 | Failed | Failed | Failed |
| Gelled Lacquer | 0.48 | Good | Good | Good |

What is claimed is:

1. A composition for coating a substrate, said composition comprising nitrocellulose resin, and organic solvent, and plasticizer, the weight ratio of plasticizer to nitrocellulose resin being about 1 to about 4 and said nitrocellulose resin being present in amounts of about 12.6% to about 8.4% by weight based on the combined weight of resin, plasticizer and solvent, said composition also including hydroxyproplycellulose acetate having a degree of substitution of acetyl groups from about 1.0 to about 2.0 and a degree of molecular substitution of hydroxypropyl groups from about 3.5 to about 4.5, said hydroxypropylcellulose acetate being present in about 0.05 to about 0.25% by weight of the combined weight of resin, plasticizer and solvent sufficient to provide a viscosity substantially the same as a conventional composition having a greater amount of nitrocellulose resin content without the hydroxypropylcellulose acetate, whereby when the composition is applied as a coating to a paper substrate, the so-coated substrate exhibits greater break strength than when coated with such conventional composition.

2. The composition of claim 1 wherein the plasticizer is di(n-butyl) phthalate.

3. The composition of claim 1 wherein the solvent is selected from the group consisting of toluene, isopropyl acetate, and mixtures thereof.

4. A composition for coating sheeting comprising: from about 12% to about 18% nitrocellulose resin, containing about 30 weight % 95% ethyl alcohol, from about 2% to about 3% di(n-butyl) phthalate, from about 34% to about 32% toluene, from about 43% to about 39% isopropyl acetate, and from about 0.25% to about 0.05% hydroxypropylcellulose acetate having a degree of substitution of acetyl groups from about 1.0 to about 2.0 and a degree of molecular substitution of hydroxypropyl groups from about 3.5 to about 4.5.

* * * * *